(12) United States Patent
Agiwal et al.

(10) Patent No.: US 11,076,326 B2
(45) Date of Patent: Jul. 27, 2021

(54) METHOD AND APPARATUS FOR PERFORMING COMMUNICATION ON UNLICENSED BAND IN WIRELESS COMMUNICATION SYSTEM

(71) Applicant: Samsung Electronics Co., Ltd., Suwon-si (KR)

(72) Inventors: Anil Agiwal, Suwon-si (KR); Himke Van Der Velde, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/586,699

(22) Filed: Sep. 27, 2019

(65) Prior Publication Data

US 2020/0107233 A1    Apr. 2, 2020

Related U.S. Application Data

(60) Provisional application No. 62/737,808, filed on Sep. 27, 2018.

(51) Int. Cl.
*H04W 36/00* (2009.01)
*H04W 72/04* (2009.01)
*H04W 84/04* (2009.01)

(52) U.S. Cl.
CPC ..... *H04W 36/0072* (2013.01); *H04W 72/042* (2013.01); *H04W 72/0446* (2013.01); *H04W 72/0453* (2013.01); *H04W 84/042* (2013.01)

(58) Field of Classification Search
CPC ....... H04W 4/14; H04W 16/12; H04W 16/14; H04W 24/00; H04W 28/04; H04W 28/08;
(Continued)

(56) References Cited

U.S. PATENT DOCUMENTS 9,713,080 B1* 7/2017 Lee ................... H04W 48/18
2017/0222780 A1* 8/2017 Diachina ............ H04W 76/28
(Continued)

FOREIGN PATENT DOCUMENTS

| WO | 2008/156412 A2 | 12/2008 |
| WO | 2017/151026 A1 | 9/2017 |
| WO | 2018/111034 A1 | 6/2018 |

OTHER PUBLICATIONS

"3rd Generation Partnership Project; Technical Specification Group Radio Access Network; NR; Radio Resource control (RRC) protocol specification (Release 15)", 3GPP TS 38.331 V15.3.0 (Sep. 2018), 446 pages.
(Continued)

*Primary Examiner* — Matthew W Genack

(57) ABSTRACT

Methods and apparatuses for performing communication on an unlicensed band. A method, performed by a UE, of performing the communication on the unlicensed band, according to an embodiment, includes receiving SI (system information) scheduling information from a base station, identifying at least one of a primary SI window number or a secondary SI window number for a SI message based on the SI scheduling information, monitoring at least one window corresponding to the primary SI window number, and in response to the SI message being not received, monitoring at least one window corresponding to the secondary SI window number.

20 Claims, 14 Drawing Sheets

(58) Field of Classification Search
CPC ..... H04W 36/30; H04W 48/16; H04W 48/18; H04W 60/00; H04W 68/00; H04W 72/04; H04W 72/0446; H04W 80/04
USPC .......... 455/435.1–435.3, 436, 438, 450–451, 455/452.1–452.2, 453–455, 458, 466; 370/329–333
See application file for complete search history.

(56) References Cited

U.S. PATENT DOCUMENTS

| | | | |
|---|---|---|---|
| 2017/0325049 A1 | 11/2017 | Basu Mallick et al. | |
| 2019/0223145 A1* | 7/2019 | Jung | H04W 76/10 |
| 2019/0313434 A1* | 10/2019 | Zhou | H04W 72/085 |
| 2020/0008131 A1* | 1/2020 | Chakraborty | H04W 16/28 |

OTHER PUBLICATIONS

Ericsson, "SI message scheduling for NB-IoT", 3GPP TSG-RAN WG2 Meeting NB-IOT ad-hoc, May 3-4, 2016, R2-163256, 6 pages.

Notification of Transmittal of the International Search Report and the Written Opinion of the International Searching Authority, or the Declaration dated Jan. 22, 2020 in connection with International Patent Application No. PCT/KR2019/012591, 12 pages.

* cited by examiner

METHOD AND APPARATUS FOR PERFORMING COMMUNICATION ON UNLICENSED BAND IN WIRELESS COMMUNICATION SYSTEM

CROSS-REFERENCE TO RELATED APPLICATION

This application is based on and claims priority under 35 U.S.C. § 119 to U.S. Application No. 62/737,808 filed on Sep. 27, 2018, the disclosure of which is herein incorporated by reference in its entirety.

BACKGROUND

1. Field

The disclosure relates to wireless communication systems, and more particularly, to methods and apparatuses for performing a communication on an unlicensed band.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analysing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

In case of unlicensed spectrum, network needs to determine whether the channel is free or not for DL-SCH transmission. If channel is not free in SI-window occasion of a SI message, network cannot transmit SI message in SI-window. Failure to transmit in several SI-windows may delay the initial access. So a method to reduce this delay is needed.

Meanwhile, in case of unlicensed spectrum, multiple operators can deploy their own networks in the unlicensed band. This means that there can be multiple cells belonging to different PLMNs on a carrier. As a result, the strongest cell may not always belong to UE's registered or equivalent PLMN. This would require the UE to search and read the system information of additional cells on a carrier for cell (re-)selection, connected mode mobility.

SUMMARY

Provided are methods and apparatuses for performing communication on an unlicensed band. A method, performed by a UE, of performing the communication on the unlicensed band, according to an embodiment, includes receiving SI (system information) scheduling information from a base station, identifying at least one of a primary SI window number or a secondary SI window number for a SI message based on the SI scheduling information, monitoring at least one window corresponding to the primary SI window number and in response to the SI message being not received, monitoring at least one window corresponding to the secondary SI window number.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
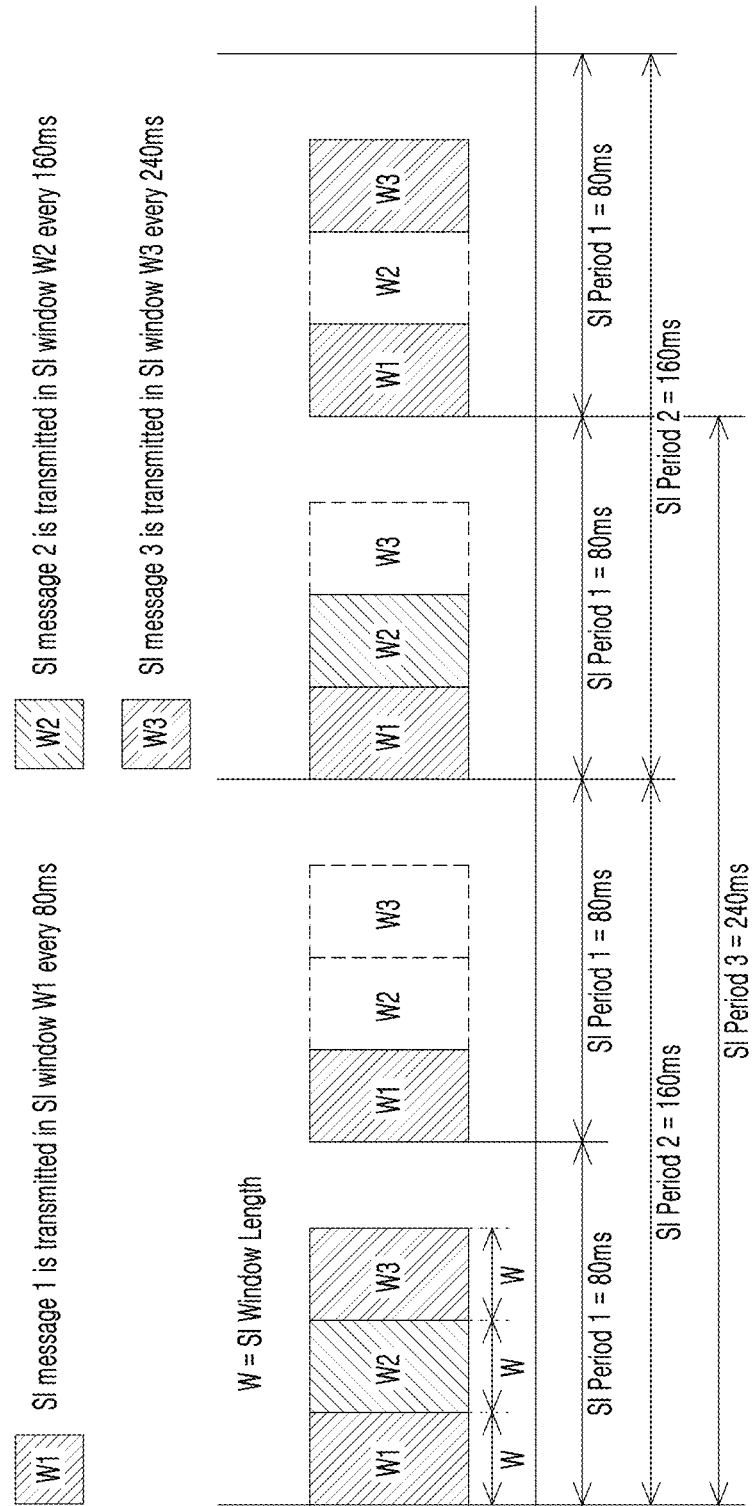
FIG. 1 illustrates a diagram of a transmission of SI messages in at least one SI window.

FIGS. 1 through 12, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The present application provides a method and an apparatus for performing a communication on an unlicensed band.

To achieve the objective above, the present application adopts the following technical solutions: a method of performing a communication on the unlicensed band, by a UE, comprising: receiving SI (system information) scheduling information from a base station; identifying at least one of a primary SI window number or a secondary SI window number for a SI message based on the SI scheduling information; monitoring at least one window corresponding to the primary SI window number; and in response to the SI message being not received, monitoring at least one window corresponding to the secondary SI window number.

Preferably, the method may further comprise identifying whether the secondary SI window number of the SI message corresponds to a primary SI window number of an other SI message, wherein in response to the secondary SI window number of the SI message being different to the primary SI window number of the other SI message, the at least one window corresponding to the secondary SI window number is monitored.

Preferably, the method may further comprise obtaining CORESET (control resource set) information or BWP (bandwidth part) information for SI messages of the base station; and identifying SI messages transmitted in a same SI window based on the CORESET information or the BWP information.

Preferably, the method may further comprise receiving the SI message of a cell detected on a specific unlicensed carrier frequency based on the monitoring of the at least one window; identifying whether a PLMN ID (public land mobile network identifier) of the cell corresponds to a desired PLMN ID for the terminal based on the received SI message; and if the PLNM ID of the cell does not correspond to the desired PLMN ID, determining whether to detect an other cell on the specific unlicensed carrier frequency based on other PLMN information included in the SI message.

A method of performing communication on an unlicensed band, by a base station, comprising: obtaining a primary SI window number and a secondary SI window number for a SI message; transmitting SI (system information) scheduling information including the primary SI window number and the secondary SI window number; and transmitting SI message in a window corresponding to the primary SI window number or the secondary SI window number, if the window is unused.

Preferably, in response to the secondary SI window number of the SI message being different to the primary SI window number of the other SI message, the at least one window corresponding to the secondary SI window number is monitored at a UE.

Preferably, the method may further comprise transmitting CORESET (control resource set) information or BWP (bandwidth part) information for SI messages of the base station.

Preferably, the SI message includes a PLMN ID of a cell and information regarding at least one PLMN ID of an other cell on a specific unlicensed carrier frequency.

A UE (user equipment) for performing communication on an unlicensed band, the UE comprising: a transceiver; and a processor coupled with the transceiver and configured to: control the transceiver to receive SI (system information) scheduling information from a base station, identify at least one of a primary SI window number or a secondary SI window number for a SI message based on the SI scheduling information, monitor at least one window corresponding to the primary SI window number, and in response to the SI message being not received, monitor at least one window corresponding to the secondary SI window number.

A base station for performing communication on an unlicensed band, the base station, comprising: a transceiver; and a processor coupled with the transceiver and configured to: obtain a primary SI window number and a secondary SI window number for a SI message, control the transceiver to transmit SI (system information) scheduling information including the primary SI window number and the secondary SI window number and control the transceiver to transmit the SI message in a window corresponding to the primary SI window number or the secondary SI window number, if the window is unused.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the present specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

According to an embodiment of the disclosure, provided is a method of obtaining SI message mapped to multiple SI windows. According to an embodiment of the disclosure, provided is a method of identifying a plurality of SI messages transmitted in a same window. According to an embodiment of the disclosure a method of cell identification based on PLMN information for minimizing a SI acquisition process. According to an embodiment of the disclosure a method of PLMN selection for reporting to a NAS.

Hereinafter, embodiments of the disclosure will be described in detail with reference to accompanying drawings.

FIG. 1 illustrates a diagram of a transmission of SI messages in at least one SI window.

In the 5th generation (also referred as NR or New Radio) wireless communication system, system information blocks (SIBs) other than SIB 1 are carried in the SI messages, which are transmitted on the DL-SCH. Only SIBs having the same periodicity can be mapped to the same SI message. Each SI message is transmitted within periodically occurring time domain windows (referred to as SI-windows with a same length for all SI messages). Each SI message is associated with a SI-window and the SI-windows of different SI messages do not overlap. That is, within one SI-window only the corresponding SI message is transmitted. In the SI-window, the UE monitors the PDCCH monitoring occasions (i.e. symbols/slots) configured for SI message reception. For SI message acquisition PDCCH monitoring occasion(s) are determined according to osi-searchSpace. If osi-searchSpace is set to zero (also referred to as default association), PDCCH monitoring occasions for SI message reception in SI-Window are the same as PDCCH monitoring occasions for SIB 1. If osi-searchSpace is not set to zero (also referred to as non-default association), PDCCH monitoring occasions for SI message is determined based on the search space indicated by osi-searchSpace. In the frequency domain, bandwidth (or coreset) for SI message reception is the initial DL BWP.

In NR, a cluster of SI-Windows (each of equal length) occurs periodically (at the smallest SI period amongst all the SI periods). For example, FIG. 1 shows a cell transmitting 3 SI messages (schedulingInfoList in si-SchedulingInfo in SIB1 includes a list of 3 SI messages) wherein SI message 1 has SI periodicity of 80 ms, SI message 2 has SI periodicity of 160 ms and SI message 3 has periodicity of 240 ms. SI message 1 is mapped to SI window number 1. SI message 2 is mapped to SI window number 2 and SI message 3 is mapped to SI window number 3. For an SI message, the SI window number is the order of entry in the list of SI messages configured by schedulingInfoList in si-SchedulingInfo in SIB 1.

Figure 2:
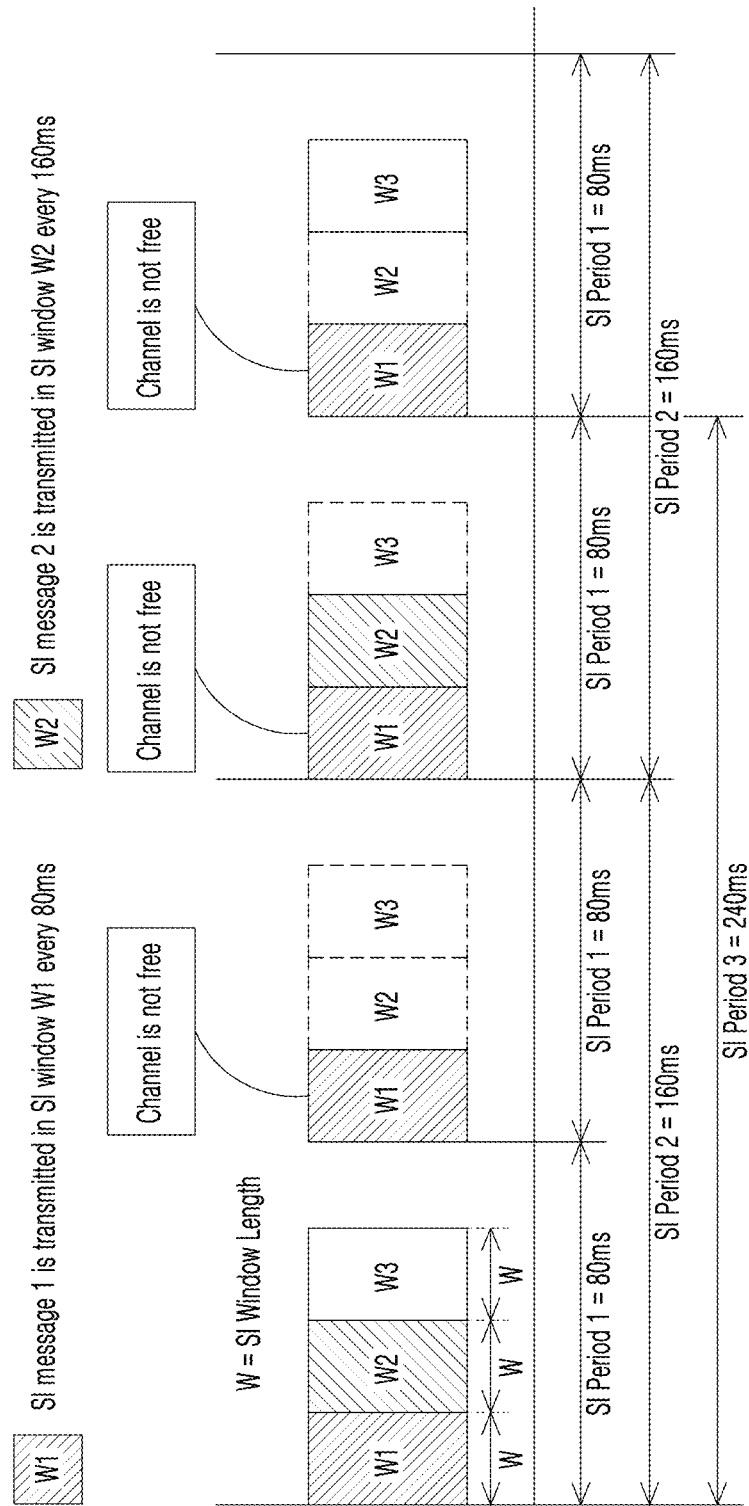
FIG. 2 illustrates a diagram of a transmission of SI messages in at least one SI window in an unlicensed spectrum.

FIG. 2 illustrates a diagram of a transmission of SI messages in at least one SI window in an unlicensed spectrum.

In case of the unlicensed spectrum, the network needs to determine whether the channel is free or not for DL-SCH transmission. If the channel is not free in the SI-window occasion of a SI message, the network cannot transmit the SI message in the SI-window. Failure to transmit in several SI-windows may delay the initial access. So a method to reduce this delay is needed.

1. SI Message Acquisition—Mapping SI message to Multiple SI Windows

In NR, a cluster of SI-Windows (each of equal length) occurs periodically (at the smallest SI period amongst all the SI periods). For example, FIG. 2 shows a cell transmitting 3 SI messages (schedulingInfoList in si-SchedulingInfo in SIB1 includes a list of 3 SI messages) wherein SI message 1 has SI periodicity of 80 ms, SI message 2 has SI periodicity of 160 ms and SI message 3 has periodicity of 240 ms. SI periodicity of each SI message is explicitly signaled in si-SchedulingInfo. The SI window length is common for all SI messages and is signaled in si-SchedulingInfo. For an SI message, the SI window number is the order of entry in the list of SI messages configured by schedulingInfoList in si-SchedulingInfo in SIB 1. SI message 1 in schedulingInfoList is mapped to SI window number 1. SI message 2 in schedulingInfoList is mapped to SI window number 2 and SI message 3 in schedulingInfoList is mapped to SI window number 3.

In case of unlicensed spectrum, the gNB needs to determine whether the channel is free or not for DL-SCH transmission. If channel is not free in SI-window occasion of a SI message, the gNB cannot transmit the SI message in the SI-window. For example, as shown in FIG. 2, if the channel is not free in W1, the gNB cannot transmit SI message 1.

In order to overcome the above issue, in an embodiment of the present disclosure, an SI message is mapped to multiple SI windows or SI window occasions (identified by SI window numbers) in the SI period of that SI message. Hereinafter, the SI message mapped to multiple SI windows or SI window occasions will be described in detail with reference to FIG. 3.

Figure 3:
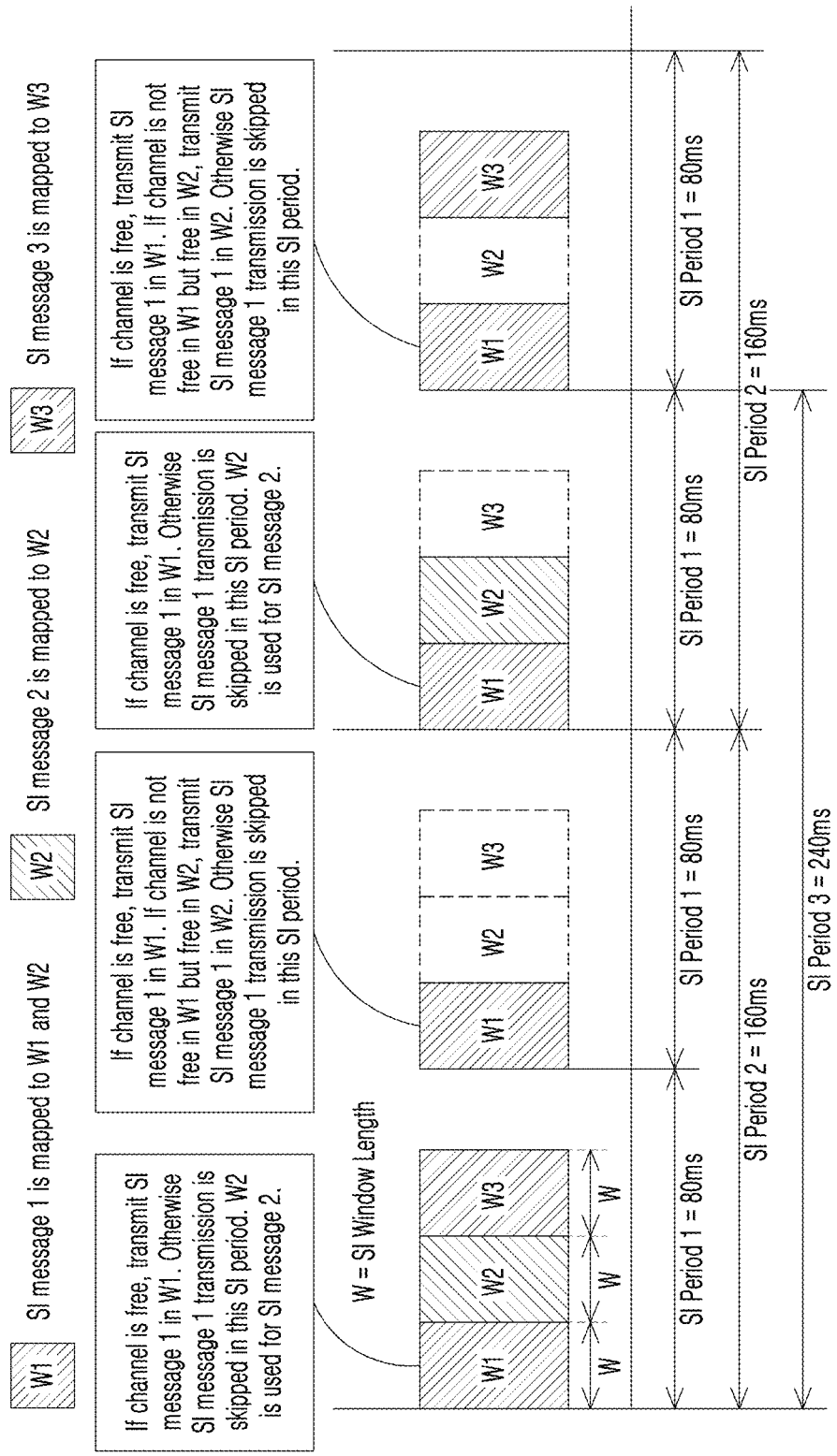
FIG. 3 illustrates a diagram of a method for transmitting the SI message mapped to multiple SI windows in an unlicensed spectrum, according to some embodiments of the disclosure.

FIG. 3 illustrates a diagram of a method for transmitting the SI message mapped to multiple SI windows in an unlicensed spectrum, according to some embodiments of the disclosure.

One of these SI windows or SI window occasions (identified by SI window number) is the primary SI window occasion (or primary SI window number) of that SI message. The SI window or SI window occasions other than the primary SI window or primary SI window occasion are the secondary SI window or secondary SI window occasions (or secondary window numbers) of that SI message.

In an embodiment, the primary SI window number and secondary SI window number(s) for the SI message may be signaled by the gNB in si-SchedulingInfo in SIB 1. However, this is merely an example, and information signalling scheduling information of the SI message is not limited to the SIB 1.

In an alternate embodiment for an SI message, the primary SI window number may be the order of entry in the list of SI messages configured by schedulingInfoList in si-SchedulingInfo in SIB 1. The secondary SI window number (s) for an SI message may be optionally signaled by the gNB in si-SchedulingInfo in SIB 1.

In an alternate embodiment for an SI message, the primary SI window number may be the order of entry in the list of SI messages configured by schedulingInfoList in si-SchedulingInfo in SIB 1. For each SI message, primary SI window number(s) of other SI messages may be the secondary window number(s).

Method 1-1:

For transmitting the SI message, in the SI period of the SI message, the gNB transmits in one SI window amongst the multiple SI windows to which this SI message is mapped. If the channel is free in the primary SI window of this SI message in the SI period, the gNB transmits the SI message in the primary SI window. If the channel is free in the secondary SI window of this SI message in the SI period, the gNB transmits the SI message in the secondary SI window of this SI message, if the secondary SI window is unused in the SI period of this SI message. The secondary SI window is considered unused if this secondary SI window is not mapped to any other SI message as a primary SI window in the SI period. In an alternate embodiment, the secondary SI window is considered unused if this secondary SI window is not used to transmit any other SI message in the SI period. In an alternate embodiment, the secondary SI window of an SI message is considered unused if the secondary SI window does not start at the same time as the primary SI window of another SI message. The SI window for a SI message starts at the slot #a, where a=x mod N, in the radio frame for which SFN mod T=FLOOR(x/N), where T is the si-Periodicity of the SI message and N is the number of slots in a radio frame and x=(n−1)*w, where w is the si-WindowLength and n is the SI window number. If the start of the secondary SI window of an SI message is the same as the start of secondary SI window of another SI message, it's up to the gNB to decide which SI message to transmit if it cannot transmit multiple SI messages in overlapping SI windows. For example, let's consider a cell transmitting 3 SI messages. SI message 1 has SI periodicity of 80 ms, SI message 2 has SI periodicity of 160 ms and SI message 3 has periodicity of 240 ms. The primary SI window for SI message 1 is SI window number 1. The primary SI window for SI message 2 is SI window number 2 and the primary SI window for SI message 3 is SI window number 3. The SI message 1 is also mapped to SI window number 2 and SI window number 3, wherein the SI window number 2 and 3 is the secondary SI window of SI message 1 and is signaled by the gNB. SI message 2 and SI message 3 are only mapped to one SI window.

SI message 2 is transmitted by the gNB in SI window if channel is free during its primary SI window. The SI window for SI message 2 starts at the slot #a, where a=x mod N, in the radio frame for which SFN mod T=FLOOR(x/N), where T is the si-Periodicity of the SI message 2 and N is the number of slots in a radio frame and x=(n−1)*w, where w is the si-WindowLength and n is the SI window number and equals to 2 for SI message 2 as SI message is mapped to SI window number 2;

SI message 3 is transmitted by the gNB in the SI window if the channel is free during its primary SI window. The SI window for SI message 3 starts at the slot #a, where a=x mod N, in the radio frame for which SFN mod T=FLOOR(x/N), where T is the si-Periodicity of the SI message 3 and N is the number of slots in a radio frame and x=(n−1)*w, where w is the si-WindowLength and n is the SI window number and equals to 3 for SI message 3 as SI message is mapped to SI window number 3;

SI message 1 may be transmitted by the gNB in the SI window if channel is free during its primary SI window. Primary SI window for SI message 1 starts at the slot #a, where a=x mod N, in the radio frame for which SFN mod T=FLOOR(x/N), where T is the si-Periodicity of the SI message 1 and N is the number of slots in a radio frame and x=(n−1)*w, where w is the si-WindowLength and n is the SI window number and equals to 1 for SI message 1 as SI message is mapped to primary SI window number 1; SI message 1 can be transmitted by the gNB in SI window if channel is free during its secondary SI window and if the secondary window does not start at the same time as the primary SI window of another SI message. Secondary SI window for SI message 1 starts at the slot #a, where a=x mod N, in the radio frame for which SFN mod T=FLOOR (x/N), where T is the si-Periodicity of the SI message 1 and N is the number of slots in a radio frame and x=(n−1)*w, where w is the si-WindowLength and n is the SI window number and equals to 2 for SI message 2 as SI message is mapped to secondary SI window number 2; The SI message 1 transmission using SI window 1 or 2 is illustrated in FIG. 3.

Figure 4:
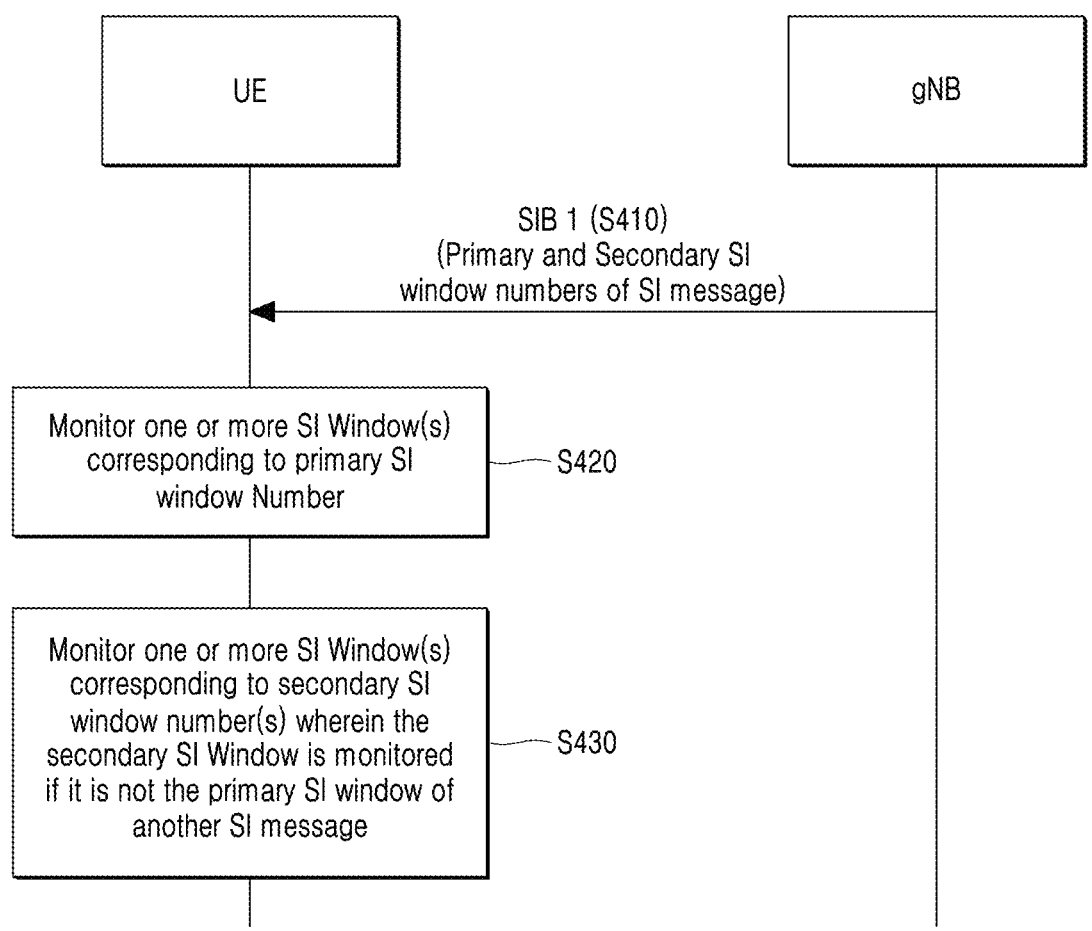
FIG. 4 illustrates a flowchart of a UE monitoring procedure for the SI messages, according to some embodiments of the disclosure.

FIG. 4 illustrates a flowchart of a UE monitoring procedure for the SI messages, according to some embodiments of the disclosure.

In operation S410, the UE may receive SIB 1 including SI scheduling information. The UE may determine the primary SI-window number and secondary SI-window numbers for a SI message. In an embodiment, the primary SI window number and secondary SI window number(s) for SI message may be signaled by the gNB in si-SchedulingInfo in SIB1. In an alternate embodiment for an SI message, the primary SI window number may be the order of entry in the list of SI messages configured by schedulingInfoList in si-SchedulingInfo in SIB 1. The secondary SI window number(s) for an SI message may be optionally signaled by the gNB in si-SchedulingInfo in SIB1. In an alternate embodiment for an SI message, primary SI window number may be the order of entry in the list of SI messages configured by schedulingInfoList in si-SchedulingInfo in SIB1. For each SI message, primary SI window number(s) of other SI messages may be the secondary window number(s).

For acquiring a concerned SI message, there may be multiple SI windows (primary and secondary) in a SI period. The UE may monitor the subsequent SI window in the SI period only if it has not yet received the SI message in a previously monitored SI window. In operation S420, the UE may monitor one or more SI window corresponding to the primary SI window number.

The UE may determine the primary and secondary Windows in SI period of concerned SI message as follows: the primary SI window starts at the slot #a, where a=x mod N, in the radio frame for which SFN mod T=FLOOR(x/N), where T is the si-Periodicity of the concerned SI message and N is the number of slots in a radio frame and x=(n−1)*w, where w is the si-WindowLength and n is the primary SI window number of the concerned SI message.

The secondary SI window starts at the slot #a, where a=x mod N, in the radio frame for which SFN mod T=FLOOR (x/N), where T is the si-Periodicity of the concerned SI message and N is the number of slots in a radio frame and x=(n−1)*w, where w is the si-WindowLength and n is the secondary SI window number of the concerned SI message.

For acquiring a concerned SI message, there may be multiple SI windows (primary and secondary) in a SI period. In operation S430, the UE may monitor one or more SI window corresponding to the secondary SI window number. The UE may monitor the subsequent SI window in the SI period only if it has not yet received the SI message in a previously monitored SI window. In an embodiment, amongst the SI windows of concerned SI message, the UE may not monitor the secondary SI-window of concerned SI message if the secondary SI window starts at the same time as the primary SI window of another SI message. In other words, the secondary SI-window of concerned SI message may be monitored if the secondary SI-window is not the primary SI-window of any other SI message in the SI period.

Method 1-2:

In another embodiment, for transmitting the SI message, in the SI period of the SI message, the gNB transmits in one SI window amongst the multiple SI windows to which this SI message is mapped. If the channel is free in the primary SI window of this SI message in the SI period, the gNB transmits the SI message in the primary SI window. If the channel is free in the secondary SI window of this SI message in the SI period, the gNB transmits the SI message in the secondary SI window of this SI message. The SI window for a SI message starts at the slot #a, where a=x mod N, in the radio frame for which SFN mod T=FLOOR(x/N), where T is the si-Periodicity of the SI message and N is the number of slots in a radio frame and x=(n−1)*w, where w is the si-WindowLength and n is the SI window number.

Figure 5:
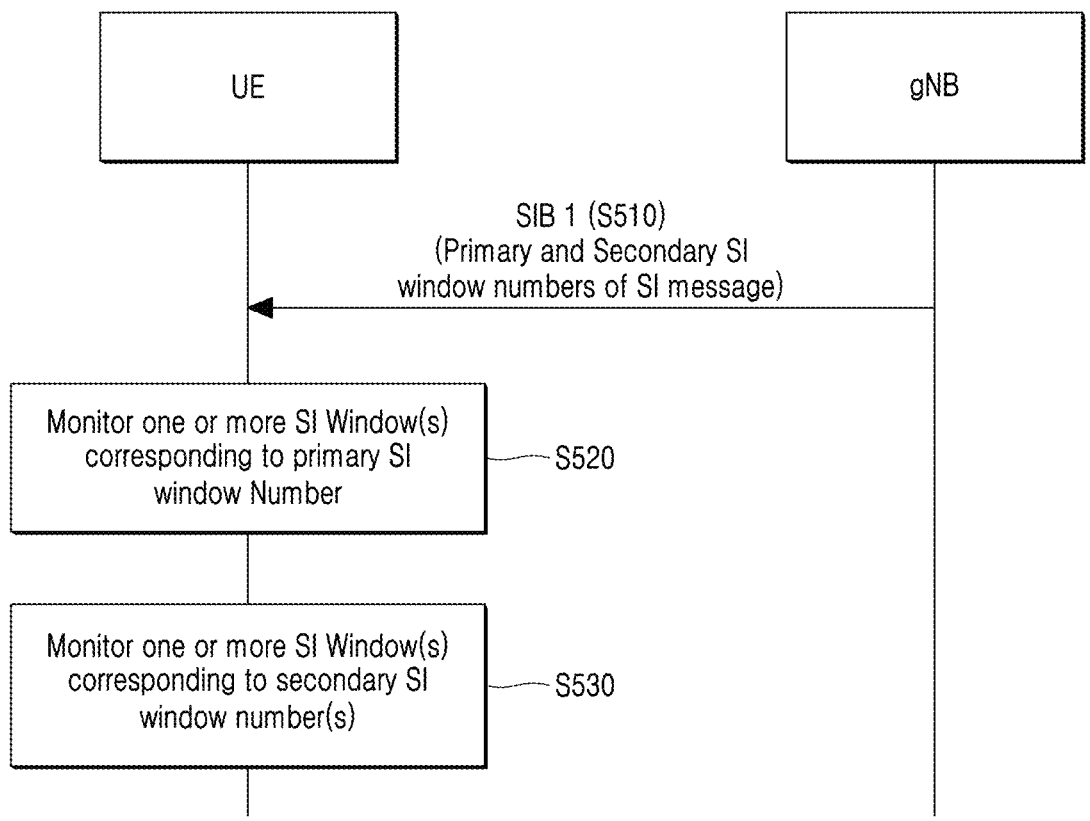
FIG. 5 illustrates a flowchart of a UE monitoring procedure for the SI messages, according to some embodiments of the disclosure.

FIG. 5 illustrates a flowchart of a UE monitoring procedure for the SI messages, according to some embodiments of the disclosure. In operation S510, the UE may receive SIB 1 including SI scheduling information. The UE may determine the primary SI-window number and secondary SI-window numbers for a SI message. In an embodiment, the primary SI window number and secondary SI window number(s) for SI message may be signaled by the gNB in si-SchedulingInfo in SIB1. In an alternate embodiment for an SI message, primary SI window number may be the order of entry in the list of SI messages configured by schedulingInfoList in si-SchedulingInfo in SIB1. The secondary SI window number(s) for an SI message may be optionally signaled by the gNB in si-SchedulingInfo in SIB1. In an alternate embodiment for an SI message, the primary SI window number may be the order of entry in the list of SI messages configured by schedulingInfoList in si-SchedulingInfo in SIB1. For each SI message, primary SI window number(s) of other SI messages may be the secondary window number(s).

In operation S520, the UE may monitor one or more SI window corresponding to the primary SI window number. In operation S530, the UE may monitor one or more SI window corresponding to the secondary SI window number. For acquiring a concerned SI message, there may be multiple SI windows (primary and secondary) in a SI period. The UE may monitor the subsequent SI window in SI period only if it has not yet received the SI message in previously monitored SI window. The UE may determine the primary and secondary Windows in SI period of concerned SI message as follows: the primary SI window starts at the slot #a, where a=x mod N, in the radio frame for which SFN mod T=FLOOR(x/N), where T is the si-Periodicity of the concerned SI message and N is the number of slots in a radio frame and x=(n−1)*w, where w is the si-WindowLength and n is the primary SI window number of the concerned SI message. The secondary SI window starts at the slot #a, where a=x mod N, in the radio frame for which SFN mod T=FLOOR(x/N), where T is the si-Periodicity of the concerned SI message and N is the number of slots in a radio frame and x=(n−1)*w, where w is the si-WindowLength and n is the secondary SI window number of the concerned SI message.

2. SI Message Acquisition—Distinguishing SI Messages Transmitted/Received in a Same SI Window Each SI message is transmitted within periodically occurring time domain SI-windows. Multiple SI messages may be mapped to a same SI-window. The SI window of larger size and mapped to multiple SI messages is more flexible in handling the channel availability then having multiple small sized SI windows mapped to one SI message. One of the issue in transmitting/receiving multiple SI messages in a same SI window is that if multiple SI messages are mapped to a same SI window, how can the UE distinguish the SI messages transmitted in a same SI window.

Figure 6:
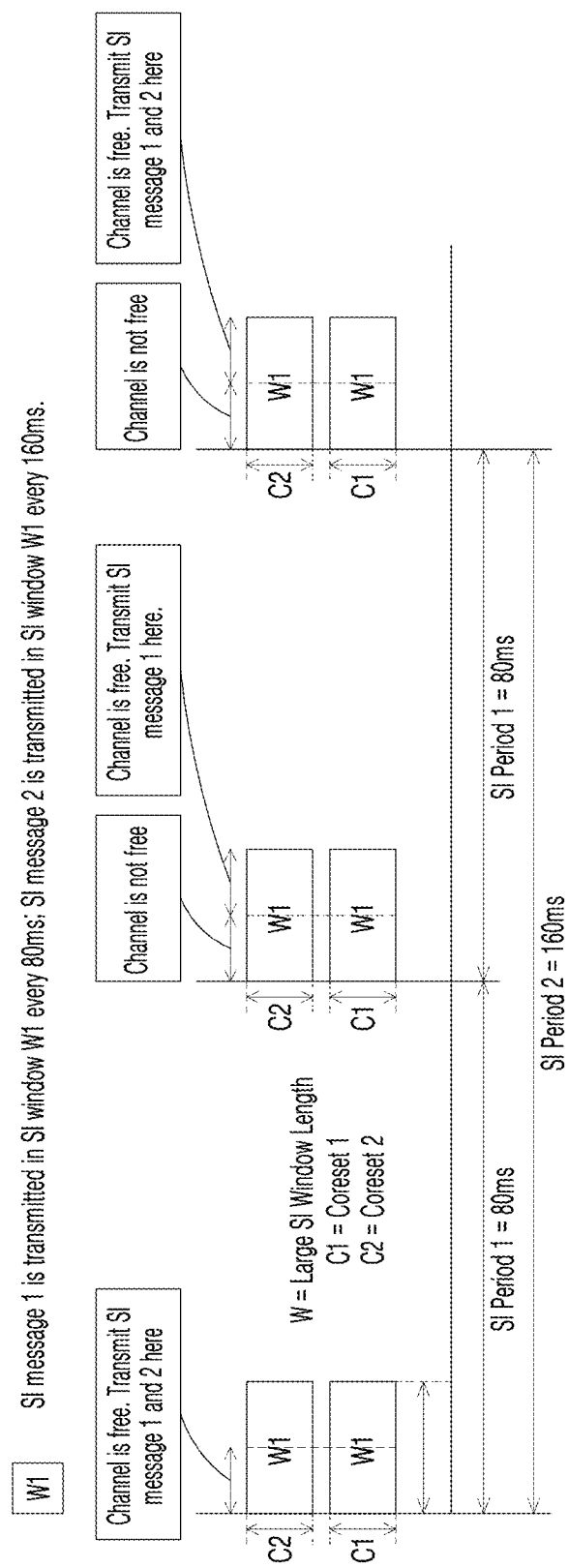
FIG. 6 illustrates a diagram of a method of identifying two SI messages mapped to a same SI window based on Coreset information, according to some embodiments of the disclosure.

Method 2-1:

FIG. 6 illustrates a diagram of a method of identifying two SI messages mapped to a same SI window based on Coreset information, according to some embodiments of the disclosure.

In this method, the gNB may signal a list of coresets (each coreset has an id) for SI messages. Coreset is a set of frequency resources (PRBs). The SI messages mapped to a same SI-window may be mapped to different coresets. In an embodiment, the gNB may explicitly indicate the coreset (i.e. coreset id) to be used for each SI message. The UE may monitor PDCCH for receiving a concerned SI message in the coreset corresponding to the concerned SI message. In case multiple SI messages are mapped to a same SI window, and the UE wants to acquire multiple of these SI messages, the UE will monitor PDCCH in multiple coresets, one corresponding to each SI message the UE wants to acquire in SI message. Referring to the FIG. 6, these SI messages are mapped to coreset 1 and coreset 2 respectively. The advantage of this approach is that the UE can avoid unnecessary decoding of PDCCHs and TBs corresponding to SI messages which the UE does not wish to acquire. The UE can simply skip monitoring the coreset for SI message which it does not wish to acquire.

In another embodiment, the mapping of the SI message to the coreset id may be implicit. Amongst the SI messages mapped to a same SI window, the nth SI message uses the nth coreset amongst the list of the coresets. For example, let's say there are three SI messages. SI message 1 and SI message 3 is mapped to SI window 1. SI message 2 is mapped to SI window 2. For SI window 1, SI message 1 uses the first coreset and SI message 3 uses the 2nd coreset in the list of coresets. For SI window 2, SI message 2 uses the first coreset in the list of coresets.

Figure 7:
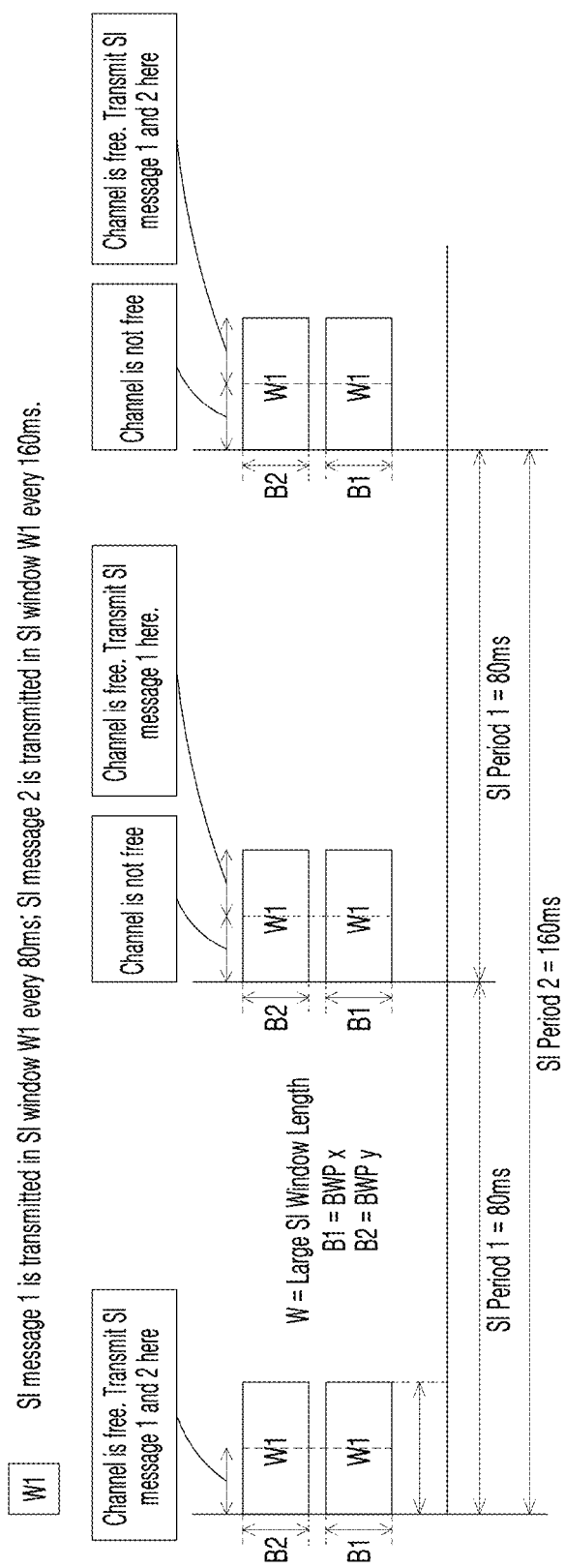
FIG. 7 illustrates a diagram of a method of identifying two SI messages mapped to a same SI window based on BWP information, according to some embodiments of the disclosure.

Method 2-2:

FIG. 7 illustrates a diagram of a method of identifying two SI messages mapped to a same SI window based on BWP information, according to some embodiments of the disclosure.

In this method, the gNB may signal a list of BWPs (each BWP has an id) for SI messages. The SI messages mapped to a same SI-window may be mapped to different BWPs. In an embodiment, the gNB may explicitly indicate BWP (i.e. BWP id) to be used for each SI message. The UE may monitor PDCCH for receiving a concerned SI message in the BWP corresponding to the concerned SI message. Referring to FIG. 7, these SI messages are mapped to BWP 1 and BWP 2 respectively. The advantage of this approach is that the UE may avoid unnecessary decoding of PDCCHs and TBs corresponding to SI messages which the UE does not wish to acquire. The UE may simply skip monitoring the BWP for SI message which it does not wish to acquire.

In another embodiment, the mapping of the SI message to BWP may be implicit. Amongst the SI messages mapped to the same SI window, the nth SI message uses the nth BWP amongst the list of the BWPs. For example, let's say there are three SI messages. SI message 1 and SI message 3 is mapped to SI window 1. SI message 2 is mapped to SI window 2. For SI window 1, SI message 1 uses the first BWP and SI message 3 uses the 2nd BWP in the list of BWPs. For SI window 2, SI message 2 uses the first BWP in the list of BWPs.

3. Minimizing SI Acquisition for Cell Identification

In the 5th generation (also referred as NR or New Radio) wireless communication system, in idle/inactive state the UE searches for the strongest cell on a given carrier. The UE camps on the strongest cell of a carrier if suitability criteria is met. The UE reads the system information of only the strongest cell on a carrier. It is assumed that all cells on a carrier belong to the same PLMN(s). In case of unlicensed spectrum, multiple operators may deploy their own networks in the unlicensed band. This means that there may be multiple cells belonging to different PLMNs on a carrier. As a result, the strongest cell may not always belong to UE's registered or equivalent PLMN. This would require the UE to search and read the system information of additional cells on a carrier for cell (re-)selection, connected mode mobility. During handover to a target cell of a specific PCI, the UE may have to read SIB 1 to identify a proper target cell of a specific PCI. Note that PCI may be re-used by operators deploying networks in unlicensed band. SI acquisition of several cells on a carrier can severely affect the UE's battery life.

Method 3-1:

In this method of the present disclosure a cell may broadcast an indication which indicates whether there are PLMN(s) other than the PLMN(s) associated with this cell on this cell's carrier frequency or not. The indication may be broadcasted in SI (e.g. SIB 1). For example, let's say there is a Cell A on carrier frequency F1. The cell A belongs to PLMN A and PLMN B. If there is one or more cells on F1 corresponding to PLMN(s) other than PLMN A and PLMN B, Cell A broadcasts an indication, e.g. OtherPLMNAbsent set to FALSE or OtherPLMNPresent set to TRUE. If there aren't any cell on F1 corresponding to PLMN(s) other than PLMN A and PLMN B, Cell A broadcasts an indication, e.g. OtherPLMNAbsent set to TRUE or OtherPLMNPresent set to FALSE.

Figure 8A:
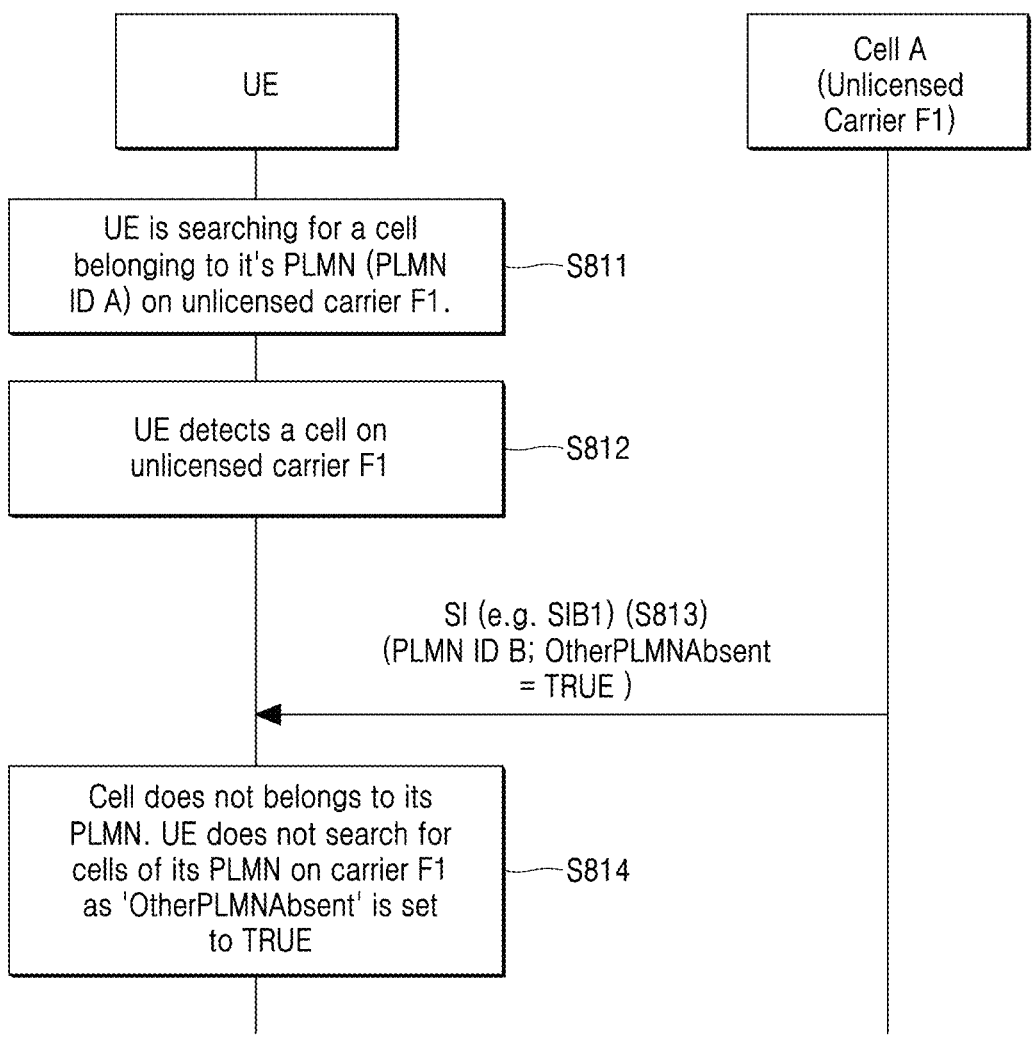
FIG. 8a illustrates a flowchart of a method of obtaining PLMN information of another cell according to an embodiment of the disclosure.

FIG. 8*a* illustrates a flowchart of a method of obtaining PLMN information of another cell according to an embodiment of the present disclosure.

In operation S811 a UE may search for a cell(s) belonging to its PLMN (e.g., PLMN ID A) on an unlicensed carrier F1.

In operation S812, the UE may detect the cell on the unlicensed carrier F1.

In operation S813, the UE may acquire the SI of a cell A detected on F1. Based on the acquired SI, the UE may determine whether the cell A belongs to its desired PLMN (e.g. registered PLMN or equivalent PLMN) or not. The cell A belongs to its desired PLMN if the desired PLMN's ID is present in the list of PLMN(s) associated with cell wherein the list of PLMN(s) associated with cell A is included in SI acquired from the cell A.

If the cell A does not belong to its desired PLMN, the UE may check whether there are cell(s) of other PLMN(s) on this unlicensed carrier F1 based on the SI acquired from the cell A. SI includes an indication which indicates whether there are PLMN(s) other than the PLMN(s) associated with Cell A on F1 or not.

In operation S814, if there aren't any cell on F1 belonging to other PLMN(s), the UE may not search for cell(s) of its PLMN on F1.

Figure 8B:
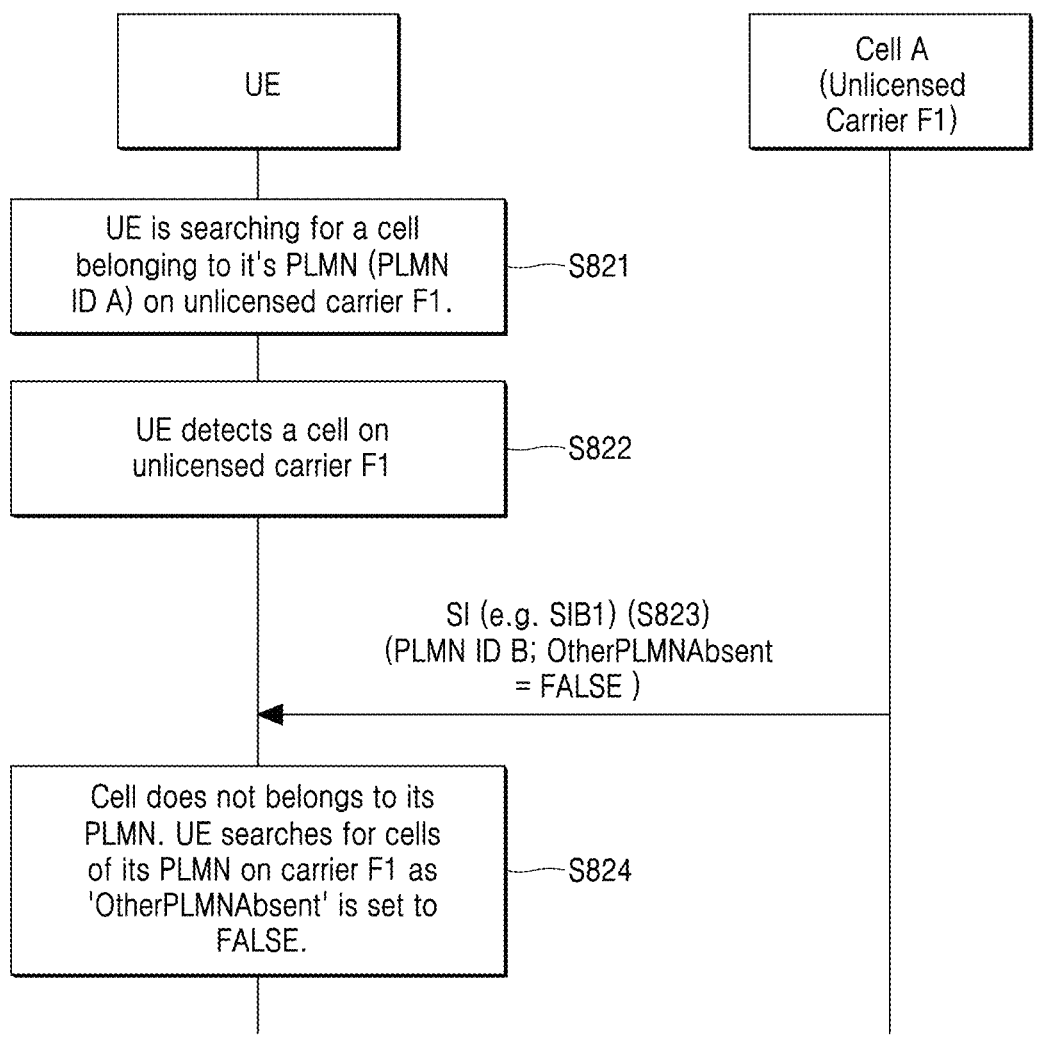
FIG. 8b illustrates a flowchart of a method of obtaining PLMN information of another cell according to another embodiment of the disclosure.

FIG. 8*b* illustrates a flowchart of a method of obtaining PLMN information of another cell according to another embodiment of the disclosure.

In operation S821 a UE may search for a cell(s) belonging to its PLMN (e.g., PLMN ID A) on an unlicensed carrier F1.

In operation S822, the UE may detect the cell on the unlicensed carrier F1.

In operation S823, the UE may acquire the SI of a cell A detected on F1. Based on the acquired SI, the UE determines whether the cell A belongs to its desired PLMN (e.g. registered PLMN or equivalent PLMN) or not.

If the cell A does not belong to its desired PLMN, the UE checks whether there are cell(s) of other PLMN(s) on this unlicensed carrier F1 based on the SI acquired from the cell A.

In operation S824, if there are cell(s) on F1 belonging to other PLMN(s), the UE may search for cell(s) of its PLMN on F1. The UE may repeat this operation another detected cell on F1. In an embodiment, the UE may first apply this operation for strongest cell amongst all the cells detected on F1. If this cell does not belong to its desired PLMN and there are cell(s) on F1 belonging to other PLMN(s), the UE may apply this operation for next strongest cell amongst all the cells detected on F1 and so on.

In an alternate embodiment of the present disclosure, a cell may broadcast an indication which indicates whether there are PLMN(s) other than the PLMN(s) associated with this cell on another carrier frequency (e.g. F2) or not.

Method 3-2:

In this method of the present disclosure, a cell may broadcast a list of PLMN(s) operating on this cell's carrier frequency, other than the PLMN(s) associated with this cell. The list is broadcasted in SI (e.g. SIB1). For example, let's say there is a Cell A on carrier frequency F1. The cell A belongs to PLMN A and PLMN B. If there are one or more cells on F1 corresponding to PLMN C and PLMN D, Cell A broadcasts a list OtherPLMNsPresentList including PLMN C and PLMN D. If there aren't any cell on F1 corresponding to PLMN(s) other than PLMN A and PLMN B, Cell A does not broadcast OtherPLMNsPresentList or broadcast an empty list.

Figure 9A:
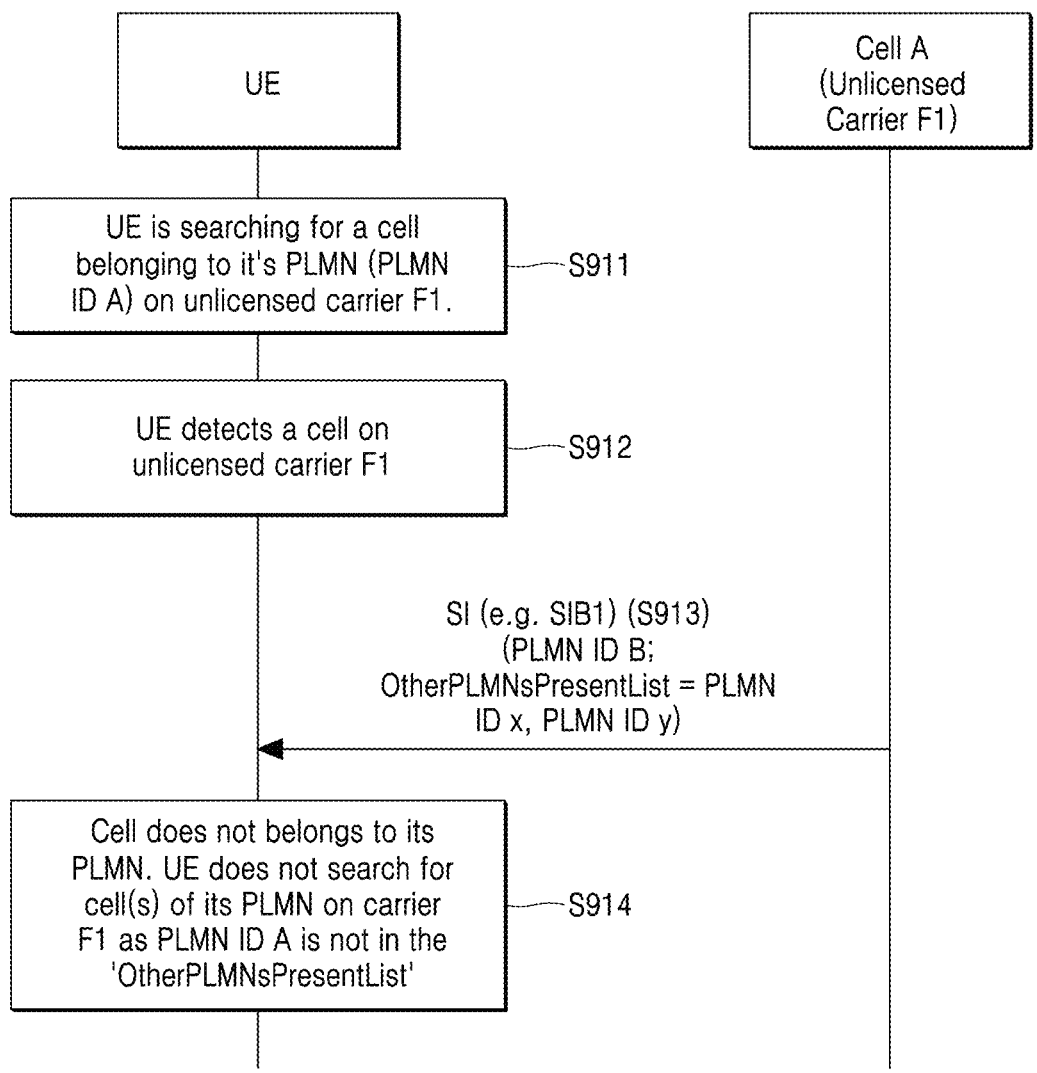
FIG. 9a illustrates a flowchart of a method of obtaining PLMN information of another cell according to another embodiment of the disclosure.

FIG. 9*a* illustrates a flowchart of a method of obtaining PLMN information of another cell according to another embodiment of the disclosure.

In operation S911 a UE may search for a cell(s) belonging to its PLMN (e.g., PLMN ID A) on an unlicensed carrier F1.

In operation S912, the UE may detect the cell on the unlicensed carrier F1.

In operation S913, the UE may acquire the SI of a cell A detected on F1. Based on the acquired SI, the UE may determine whether the cell A belongs to its desired PLMN (e.g. registered PLMN or equivalent PLMN) or not. The cell A belongs to its desired PLMN if the desired PLMN's ID is present in the list of PLMN(s) associated with cell A wherein the list of PLMN(s) associated with cell A is included in SI acquired from the cell A. If the cell A does not belong to its desired PLMN, the UE check whether there are cell(s) of its desired PLMN(s) on this unlicensed carrier F1 based on the SI acquired from the cell A. SI includes a list (OtherPLMNsPresentList) of PLMN(s) operating on cell A carrier frequency (i.e. F1), other than the PLMN(s) associated with this cell. If there aren't any cell on F1 corresponding to PLMN(s) other than PLMN(s) associated with this cell, Cell A does not broadcast OtherPLMNsPresentList or broadcast an empty list.

In operation S914, if there aren't any cell on F1 belonging to its desired PLMN(s), the UE may not search for cells of its PLMN on F1.

Figure 9B:
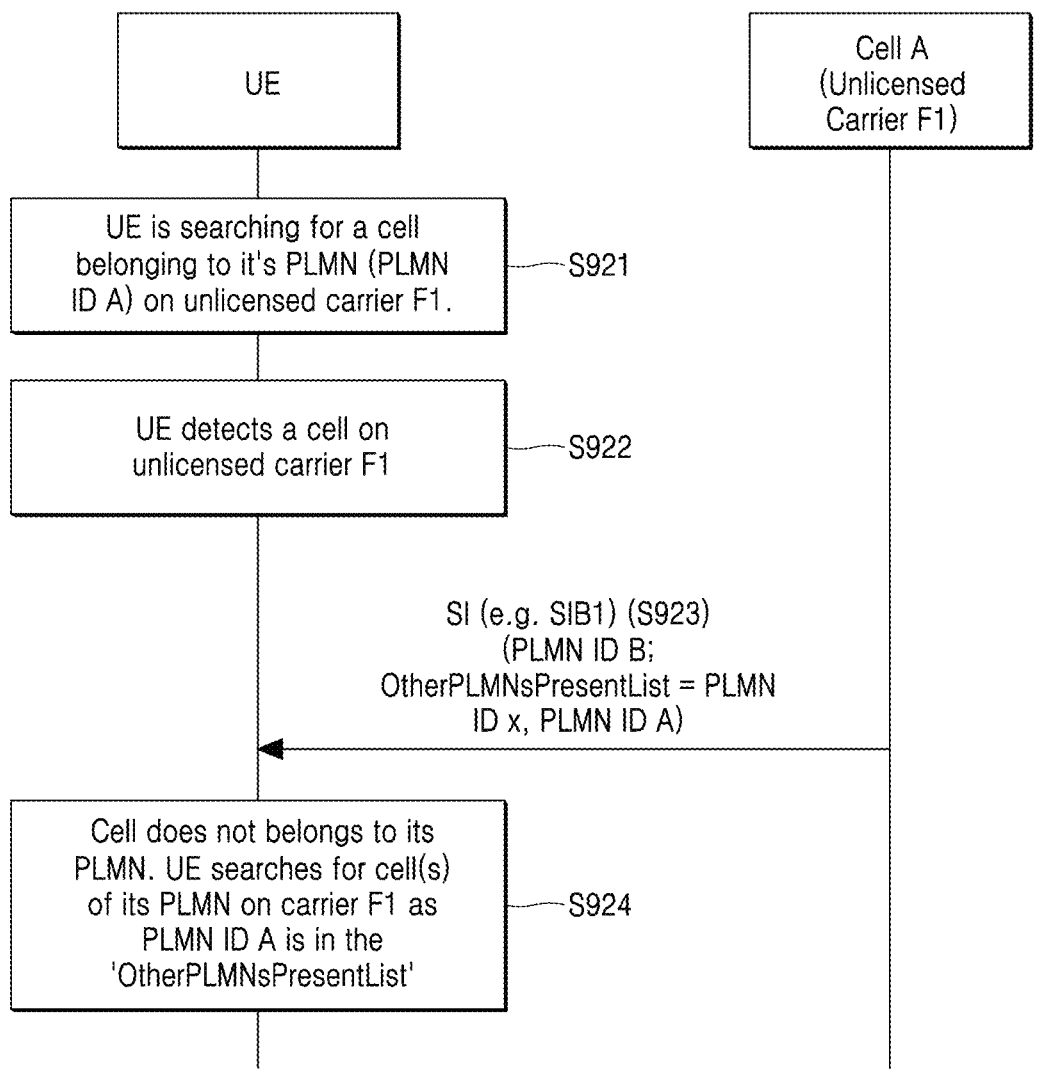
FIG. 9b illustrates a flowchart of a method of obtaining PLMN information of another cell according to another embodiment of the disclosure.

FIG. 9b illustrates a flowchart of a method of obtaining PLMN information of another cell according to another embodiment of the disclosure.

In operation S921 a UE may search for a cell(s) belonging to its PLMN (e.g., PLMN ID A) on an unlicensed carrier F1.

In operation S922, the UE may detect the cell on the unlicensed carrier F1.

In operation S923, the UE may acquire the SI of a cell A detected on F1. Based on the acquired SI, the UE determines whether the cell A belongs to its desired PLMN (e.g. registered PLMN or equivalent PLMN) or not.

If the cell A does not belong to its desired PLMN, the UE check whether there are cell(s) of other PLMN(s) on this unlicensed carrier F1 based on the SI acquired from the cell A.

In operation S924, if there are cell(s) on F1 belonging to its desired PLMN(s), the UE may search for cells of its PLMN on F1. UE may repeat this operation another detected cell on F1. In an embodiment, the UE may first apply this operation for strongest cell amongst all the cells detected on F1. If this cell does not belong to its desired PLMN and there are cell(s) on F1 belonging to its desired PLMN(s), the UE may apply this operation for next strongest cell amongst all the cells detected on F1 and so on.

In an alternate embodiment of the present disclosure, a cell may broadcast a list of PLMN(s) operating on another carrier frequency (e.g. F2) or not.

Method 3-3:

In this method of the present disclosure, cell may broadcast a list of PLMN(s) operating on this cell's carrier frequency, other than the PLMN(s) associated with this cell. The list may be broadcasted in SI (e.g. SIB1). For example, let's say there is a Cell A on carrier frequency F1. The cell A belongs to PLMN A and PLMN B. If there are one or more cells on F1 corresponding to PLMN C and PLMN D, Cell A broadcasts a list OtherPLMNsPresentList including PLMN C and PLMN D. If the cell is not aware of PLMN(s) operating on this cell's carrier frequency, other than the PLMN(s) associated with this cell, a cell broadcasts an indication which indicates whether there are PLMN(s) other than the PLMN(s) associated with this cell on this cell's carrier frequency or not.

A UE which is searching for cell(s) on an unlicensed carrier F1, may perform the following operation: the UE may acquire the SI of a cell A detected on F1. Based on the acquired SI, the UE may determine whether the cell A belongs to its desired PLMN (e.g. registered PLMN or equivalent PLMN) or not. The cell A belongs to its desired PLMN if the desired PLMN's ID is present in the list of PLMN(s) associated with cell A wherein the list of PLMN(s) associated with cell A is included in SI acquired from the cell A. If the cell A does not belong to its desired PLMN, the UE may check whether there are cell(s) of its desired PLMN(s) on this unlicensed carrier F1 based on the SI acquired from the cell A. SI may include a list (OtherPLMNsPresentList) of PLMN(s) operating on cell A carrier frequency (i.e. F1), other than the PLMN(s) associated with this cell. If the cell is not aware of PLMN(s) operating on this cell's carrier frequency, other than the PLMN(s) associated with this cell, a cell may broadcast an indication which indicates whether there are PLMN(s) other than the PLMN(s) associated with this cell on this cell's carrier frequency or not.

If OtherPLMNsPresentList is included in SI and desired PLMN(s) are not included in OtherPLMNsPresentList, the UE may not search for cells of its PLMN on F1. If OtherPLMNsPresentList is included in SI and desired PLMN(s) are included in OtherPLMNsPresentList, the UE may search for cells of its PLMN on F1. If OtherPLMNsPresentList is not included and SI indicates (e.g. OtherPLMNsAbsent=FALSE) that there are cell(s) on F1 belonging to other PLMN(s), the UE may search for cell(s) of its PLMN on F1.

The UE may repeat this operation another detected cell on F1. In an embodiment, the UE may first apply this operation for strongest cell amongst all the cells detected on F1. If this cell does not belong to its desired PLMN and there are cell(s) on F1 belonging to its desired PLMN(s), the UE may apply this operation for next strongest cell amongst all the cells detected on F1 and so on.

4. PLMN Selection

Figure 10:
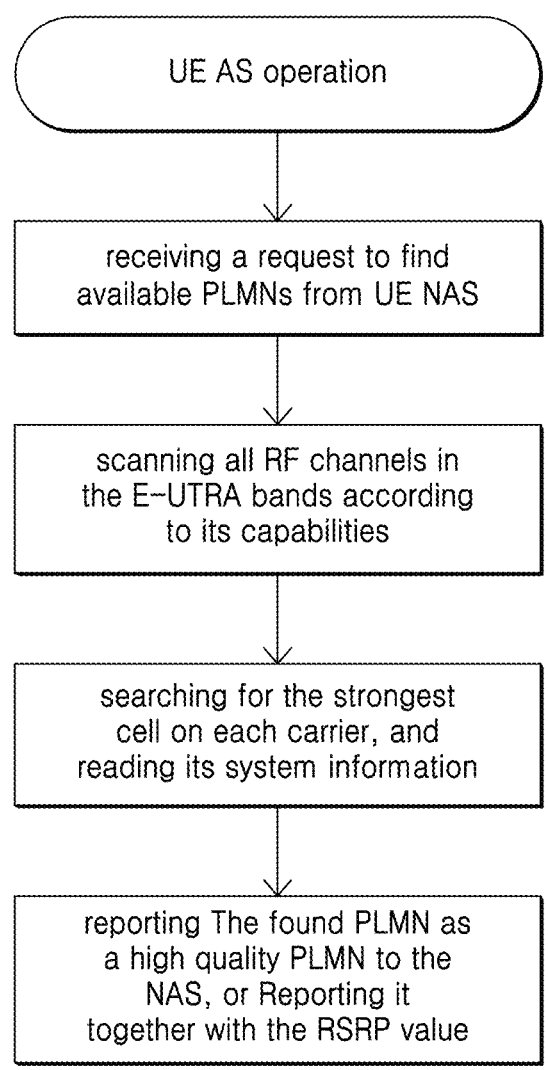
FIG. 10 illustrates an illustration of preparing a list of PLMNs for PLMN selection for licensed carrier.

FIG. 10 illustrates an illustration of preparing a list of PLMNs for PLMN selection for licensed carrier.

In operation S1010, the UE AS may receive a request to find available PLMNs from the UE NAS.

In operation S1020, the UE AS may scan all RF channels in the E-UTRA bands according to its capabilities.

In operation S1030, the UE AS may search for the strongest cell on each carrier, and read its system information.

In operation S1040, the UE AS may report the found PLMN as a high quality PLMN to the NAS or report it together with the RSRP value. Inhere, the high quality criterion is that for an E-UTRAN and NB-IoT cell, the measured RSRP value should be greater than or equal to −110 dBm.

Method 4-1:

For unlicensed carrier, in this method according to an embodiment of the disclosure, the operation to prepare the list of PLMNs for each carrier is as follows:

In this method of disclosure, a cell may broadcast a list of PLMN(s) operating on this cell's carrier frequency, other than the PLMN(s) associated with this cell. The list may be broadcasted in SI (e.g. SIB1). For example, let's say there is a Cell A on carrier frequency F1. The cell A belongs to PLMN A and PLMN B. If there are one or more cells on F1 corresponding to PLMN C and PLMN D, Cell A broadcasts a list OtherPLMNsPresentList including PLMN C and PLMN D. If there aren't any cell on F1 corresponding to PLMN(s) other than PLMN A and PLMN B, Cell A does not broadcast OtherPLMNsPresentList or broadcast an empty list. The list of PLMN(s) associated with cell is broadcasted in SI.

Cell meeting high quality criterion is detected on a carrier:
Acquire the SI of detected cell.
If system information includes OtherPLMNsPresentList,
    there is no need to search for other cells on the carrier;
List of PLMNs to be reported to NAS
Add the PLMNs to which the detected cell is associated
    and PLMNs in OtherPLMNsPresentList
Else if system information does not include OtherPLMNsPresentList
Search other cells (up to N) on the carrier:
List of PLMNs to be reported to NAS
Add the PLMNs to which each detected cell is associated
N can be pre-defined or signaled by network In addition to PLMNs identified by above procedure on unlicensed carriers, the UE will find PLMNs on licensed carrier(s) using the procedure in prior art (as shown in FIG. 10) and send all PLMNs identified on licensed and unlicensed carriers to NAS.

Method 4-2:

For unlicensed carrier, in this method according to an embodiment of the disclosure, the operation to prepare the list of PLMNs for each carrier is as follows:

In this method of the disclosure, a cell broadcasts an indication which indicates whether there are PLMN(s) other than the PLMN(s) associated with this cell on this cell's carrier frequency or not. The indication is broadcasted in SI (e.g. SIB1). For example, let's say there is a Cell A on carrier frequency F1. The cell A belongs to PLMN A and PLMN B. If there is one or more cells on F1 corresponding to PLMN(s) other than PLMN A and PLMN B, Cell A broadcasts an indication, e.g. OtherPLMNAbsent set to FALSE or OtherPLMNPresent set to TRUE. If there aren't any cell on F1 corresponding to PLMN(s) other than PLMN A and PLMN B, Cell A broadcasts an indication, e.g. OtherPLMNAbsent set to TRUE or OtherPLMNPresent set to FALSE. The list of PLMN(s) associated with cell is broadcasted in SI.

Cell meeting high quality criterion is detected on a carrier:
    Acquire the SI of detected cell.
    If system information indicates there aren't any cell(s) of PLMN(s) other than PLMN(s) associated with this cell there is no need to search for other cells on the carrier;
    List of PLMNs to be reported to NAS
    Add the PLMNs to which the detected cell is associated
    Else if system information indicates there are cell(s) of PLMN(s) other than PLMNs associated with this cell
    Search other cells (up to N) on the carrier:
    List of PLMNs to be reported to NAS
    Add the PLMNs to which each detected cell is associated
    N can be pre-defined or signaled by network In addition to PLMNs identified by above procedure on unlicensed carriers, the UE will find PLMNs on licensed carrier(s) using the procedure in prior art (as shown in FIG. 10) and send all PLMNs identified on licensed and unlicensed carriers to NAS.

Method 4-3:

In this method of the disclosure, cell may broadcast a list of PLMN(s) operating on this cell's carrier frequency, other than the PLMN(s) associated with this cell. The list is broadcasted in SI (e.g. SIB1). For example, let's say there is a Cell A on carrier frequency F1. The cell A belongs to PLMN A and PLMN B. If there are one or more cells on F1 corresponding to PLMN C and PLMN D, Cell A broadcasts a list OtherPLMNsPresentList including PLMN C and PLMN D. If the cell is not aware of PLMN(s) operating on this cell's carrier frequency, other than the PLMN(s) associated with this cell, a cell broadcasts an indication which indicates whether there are PLMN(s) other than the PLMN(s) associated with this cell on this cell's carrier frequency or not.

The list of PLMN(s) associated with cell is broadcasted in SI.

Cell meeting high quality criterion is detected on a carrier:
    Acquire the SI of detected cell.
    If system information includes OtherPLMNsPresentList, there is no need to search for other cells on the carrier;
    List of PLMNs to be reported to NAS
    Add the PLMNs to which the detected cell is associated and PLMNs in OtherPLMNsPresentList
    Else if system information indicates there are cell(s) of PLMN(s) other than PLMNs associated with this cell
    Search other cells (up to N) on the carrier:
    List of PLMNs to be reported to NAS
    Add the PLMNs to which each detected cell is associated
    N can be pre-defined or signaled by network
    Else If system information indicates there aren't any cell(s) of PLMN(s) other than PLMN(s) associated with this cell there is no need to search for other cells on the carrier;
    List of PLMNs to be reported to NAS
    Add the PLMNs to which the detected cell is associated In addition to PLMNs identified by above procedure on unlicensed carriers, the UE will find PLMNs on licensed carrier(s) using the procedure in prior art (as shown in FIG. 10) and send all PLMNs identified on licensed and unlicensed carriers to NAS.

Figure 11:
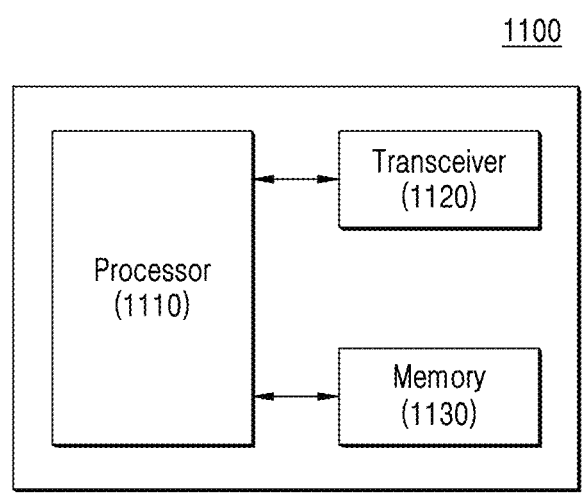
FIG. 11 illustrates a diagram of a UE according to an embodiment of the present disclosure.

FIG. 11 illustrates a diagram of a UE 1100 according to an embodiment of the present disclosure.

Referring to the FIG. 11, the UE 1100 may include a processor 1110, a transceiver 1120 and a memory 1130. However, all of the illustrated components are not essential. The UE 1100 may be implemented by more or less components than those illustrated in the FIG. 11. In addition, the processor 1110 and the transceiver 1120 and the memory 1130 may be implemented as a single chip according to another embodiment.

The aforementioned components will now be described in detail.

The processor 1110 may include one or more processors or other processing devices that control the proposed function, process, and/or method. Operation of the UE 1100 may be implemented by the processor 1110.

The processor 1110 may control the transceiver to receive SI (system information) scheduling information from a base station. The processor 1110 may identify at least one of a primary SI window number or a secondary SI window number for a SI message based on the SI scheduling information. The processor 1110 may monitor at least one window corresponding to the primary SI window number. The processor 1110 may monitor at least one window corresponding to the secondary SI window number, in response to the SI message being not received, The transceiver 1120 may include a RF transmitter for up-converting and amplifying a transmitted signal, and a RF receiver for down-converting a frequency of a received signal. However, according to another embodiment, the transceiver 1120 may be implemented by more or less components than those illustrated in components.

The transceiver 1120 may be connected to the processor 1110 and transmit and/or receive a signal. The signal may include control information(e.g. SI message) and data. In addition, the transceiver 1120 may receive the signal through a wireless channel and output the signal to the processor 1110. The transceiver 1120 may transmit a signal output from the processor 1110 through the wireless channel.

The memory 1130 may store the control information or the data included in a signal obtained by the UE 1100. The memory 1130 may be connected to the processor 1110 and store at least one instruction or a protocol or a parameter for the proposed function, process, and/or method. The memory 1130 may include read-only memory (ROM) and/or random access memory (RAM) and/or hard disk and/or CD-ROM and/or DVD and/or other storage devices.

Figure 12:
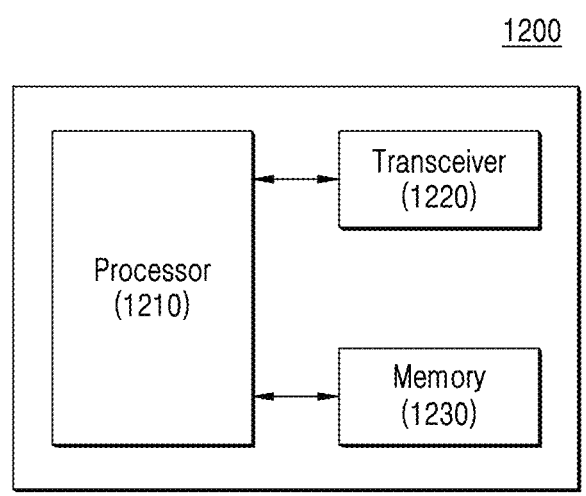
FIG. 12 illustrates a diagram of a base station according to an embodiment of the present disclosure.

FIG. 12 illustrates a diagram of a base station 1200 according to an embodiment of the present disclosure.

Referring to the FIG. 12, the base station 1200 may include a processor 1210, a transceiver 1220 and a memory 1230. However, all of the illustrated components are not essential. The terminal 600 may be implemented by more or less components than those illustrated in FIG. 12. In addition, the processor 610 and the transceiver 1220 and the memory 1230 may be implemented as a single chip according to another embodiment.

The aforementioned components will now be described in detail.

The processor 1210 may include one or more processors or other processing devices that control the proposed function, process, and/or method. Operation of the base station 1200 may be implemented by the processor 1210.

The processor 1210 may obtain a primary SI window number and a secondary SI window number for a SI message. The processor 1210 may control the transceiver to transmit SI (system information) scheduling information including the primary SI window number and the secondary SI window number. The processor 1210 may control the transceiver to transmit the SI message in a window corresponding to the primary SI window number or the secondary SI window number, if the window is unused. The transceiver 1220 may include a RF transmitter for up-converting and amplifying a transmitted signal, and a RF receiver for down-converting a frequency of a received signal. However, according to another embodiment, the transceiver 1220 may be implemented by more or less components than those illustrated in components.

The transceiver 1220 may be connected to the processor 1210 and transmit and/or receive a signal. The signal may include control information and data. In addition, the transceiver 1220 may receive the signal through a wireless channel and output the signal to the processor 1210. The transceiver 1220 may transmit a signal output from the processor 1210 through the wireless channel.

The memory 1230 may store the control information or the data included in a signal obtained by the base station 1200. The memory 1230 may be connected to the processor 1210 and store at least one instruction or a protocol or a parameter for the proposed function, process, and/or method. The memory 1230 may include read-only memory (ROM) and/or random access memory (RAM) and/or hard disk and/or CD-ROM and/or DVD and/or other storage devices. At least some of the example embodiments described herein may be constructed, partially or wholly, using dedicated special-purpose hardware. Terms such as 'component', 'module' or 'unit' used herein may include, but are not limited to, a hardware device, such as circuitry in the form of discrete or integrated components, a Field Programmable Gate Array (FPGA) or Application Specific Integrated Circuit (ASIC), which performs certain tasks or provides the associated functionality. In some embodiments, the described elements may be configured to reside on a tangible, persistent, addressable storage medium and may be configured to execute on one or more processors. These functional elements may in some embodiments include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. Although the example embodiments have been described with reference to the components, modules and units discussed herein, such functional elements may be combined into fewer elements or separated into additional elements. Various combinations of optional features have been described herein, and it will be appreciated that described features may be combined in any suitable combination. In particular, the features of any one example embodiment may be combined with features of any other embodiment, as appropriate, except where such combinations are mutually exclusive. Throughout this specification, the term "comprising" or "comprises" means including the component(s) specified but not to the exclusion of the presence of others.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

Although the present disclosure has been described with various embodiments, various changes and modifications may be suggested to one skilled in the art. It is intended that the present disclosure encompass such changes and modifications as fall within the scope of the appended claims.

What is claimed:

1. A method for performing communication on an unlicensed band, by a user equipment (UE), the method comprising:

receiving, from a base station, system information (SI) scheduling information including information on SI messages including a first SI message and a second SI message;

identifying, based on the SI scheduling information, a primary SI window number and a secondary SI window number for the first SI message among the SI messages, wherein primary SI window numbers for each of the SI messages including the first SI message and the second SI message are set differently;

monitoring at least one first window corresponding to the primary SI window number for the first SI message when a channel for receiving the first SI message in the at least one first window is free; and in response to not receiving the first SI message in the at least one first window, monitoring at least one second window corresponding to the secondary SI window number for the first SI message in case that a channel for receiving the first SI message in the at least one second window is free and the second window is not used for another SI message among the SI messages, wherein the secondary SI window number for the first SI message is set to at least one window number including a primary number of the other SI message among the SI messages.

2. The method of claim 1, further comprising:

identifying whether the secondary SI window number for the first SI message corresponds to another primary SI window number for the second SI message among the SI messages, and in response to identifying that the secondary SI window number for the first SI message is different than the other primary SI window number for the second SI message, monitoring the at least one second window corresponding to the secondary SI window number.

3. The method of claim 1, further comprising:
receiving, from the base station, control resource set (CORESET) information for the SI messages; and
identifying, based on the CORESET information, the SI messages transmitted in a same SI window.

4. The method of claim 1, further comprising:
receiving, from the base station, bandwidth part (BWP) information for the SI messages; and
identifying, based on the BWP information, the SI messages transmitted in a same SI window.

5. The method of claim 1, further comprising:
receiving the first SI message of a cell detected on an unlicensed band carrier frequency;
determining, based on the first SI message of the cell, whether a public land mobile network identifier (PLMN ID) of the cell corresponds to a desired PLMN ID for the UE; and
based on a determination that the PLMN ID of the cell does not correspond to the desired PLMN ID, determining whether to search for another cell on the unlicensed band carrier frequency based on PLMN information included in the first SI message.

6. A method for performing communication on an unlicensed band, by a base station, the method comprising:
identifying primary system information (SI) window numbers and secondary SI window numbers for SI messages, wherein the primary SI window numbers for each of the SI messages including a first SI message and a second SI message are set differently, and wherein the secondary SI window number for the first SI message is set to at least one window number including a primary number of the other SI message among the SI messages;
transmitting, to a user equipment (UE), SI scheduling information including the primary SI window numbers and the secondary SI window numbers; and
transmitting the first SI message among the SI messages in a window corresponding to a primary SI window number for the first SI message or a secondary SI window number for the first SI message when the window corresponding to the primary SI window number and the secondary SI window number is not used for another SI message among the SI messages,
wherein a channel for transmitting the first SI message in the window is free.

7. The method of claim 6, wherein in response to identifying that the secondary SI window number for the first SI message is different than another primary SI window number for the second SI message, the window corresponding to the secondary SI window number is monitored at the UE.

8. The method of claim 6, further comprising:
transmitting, to the UE, control resource set (CORESET) information for the SI messages.

9. The method of claim 6, further comprising:
transmitting, to the UE, bandwidth part (BWP) information for the SI messages.

10. The method of claim 6, wherein the first SI message includes a public land mobile network identifier (PLMN ID) of a cell and information associated with at least one PLMN ID of another cell on an unlicensed band carrier frequency.

11. A user equipment (UE) for performing communication on an unlicensed band, the UE comprising:

a transceiver; and
a processor coupled with the transceiver and configured to:
control the transceiver to receive, from a base station, system information (SI) scheduling information including information on SI messages including a first SI message and a second SI message,
identify, based on the SI scheduling information, a primary SI window number for a first SI message among SI messages and a secondary SI window number for the first SI message among the SI messages, wherein primary SI window numbers for each of the SI messages including the first SI message and the second SI message are set differently,
monitor at least one first window corresponding to the primary SI window number for the first SI message when a channel for receiving the first SI message in the at least one first window is free, and
in response to not receiving the SI message in the at least one first window, monitor at least one second window corresponding to the secondary SI window number for the first SI message in case that a channel for receiving the first SI message in the at least one second window is free and the second window is not used for another SI message among the SI messages,
wherein the secondary SI window number for the first SI message is set to at least one window number including a primary number of the other SI message among the SI messages.

12. The UE of claim 11, wherein the processor is further configured to:
identify whether the secondary SI window number for the first SI message corresponds to another primary SI window number for the second SI message among the SI messages; and
in response to identifying that the secondary SI window number for the first SI message is different than the other primary SI window number for the second SI message, monitor the at least one second window corresponding to the secondary SI window number.

13. The UE of claim 11, wherein the processor is configured to:
receiver, from the base station, control resource set (CORESET) information for the SI messages; and
identify, based on the CORESET information, the SI messages transmitted in a same SI window.

14. The UE of claim 11, wherein the processor is further configured to:
receive, from the base station, obtain bandwidth part (BWP) information for the SI messages; and
identify, based on the BWP information, the SI messages transmitted in a same SI window.

15. The UE of claim 11, wherein the processor is further configured to:
control the transceiver to receive the first SI message of a cell detected on an unlicensed band carrier frequency;
determine, based on the first SI message of the cell, whether a public land mobile network identifier (PLMN ID) of the cell corresponds to a desired PLMN ID for the UE; and
if the PLNM ID of the cell does not correspond to the desired PLMN ID, determine whether to search for another cell on the unlicensed band carrier frequency based on PLMN information included in the first SI message.

16. A base station for performing communication on an unlicensed band, the base station comprising:

a transceiver; and
a processor coupled with the transceiver and configured to:
  identify primary system information (SI) window numbers and secondary SI window numbers for SI messages, wherein the primary SI window numbers for each of the SI messages including a first SI message and a second SI message are set differently, and wherein the secondary SI window number for the first SI message is set to at least one window number including a primary number of the other SI message among the SI messages,
  control the transceiver to transmit, to a user equipment (UE), SI scheduling information including the primary SI window numbers and the secondary SI window numbers, and
  control the transceiver to transmit the first SI message among the SI messages in a window corresponding to a primary SI window number or a secondary SI window number for the first SI message if the window corresponding to the primary SI window number and the secondary SI window number is not used for another SI message among the SI messages, wherein a channel for transmitting the first SI message in the window is free.

17. The base station of claim 16, wherein in response to identifying that the secondary SI window number for the first SI message is different than another primary SI window number for the second SI message, the window corresponding to the secondary SI window number is monitored at the UE.

18. The base station of claim 16, wherein the processor is further configured to control the transceiver to transmit, to the UE, control resource set (CORESET) information for the SI messages.

19. The base station of claim 16, wherein the processor is configured to control the transceiver to transmit, to the UE, bandwidth part (BWP) information for the SI messages.

20. The base station of claim 16, wherein the first SI message includes a public land mobile network identifier (PLMN ID) of a cell and information associated with at least one PLMN ID of another cell on un unlicensed band carrier frequency.

* * * * *